United States Patent
Keely et al.

(10) Patent No.: US 6,611,274 B1
(45) Date of Patent: Aug. 26, 2003

(54) SYSTEM METHOD, AND COMPUTER PROGRAM PRODUCT FOR COMPOSITING TRUE COLORS AND INTENSITY-MAPED COLORS INTO A FRAME BUFFER

(75) Inventors: Leroy B. Keely, Portola Valley, CA (US); Andrew J. Palay, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/416,055

(22) Filed: Oct. 12, 1999

(Under 37 CFR 1.47)

(51) Int. Cl.[7] .............................. G09G 5/02; G09G 5/10; G06K 9/40; G06K 9/00; H04N 7/12
(52) U.S. Cl. ....................... 345/600; 345/589; 345/597; 345/605; 345/545; 345/547; 345/549; 348/393.1; 348/394.1; 348/395.1; 348/403.1; 348/420.1; 382/162; 382/167; 382/232; 382/237; 382/274; 382/245
(58) Field of Search ................................ 345/418, 422, 345/426, 581, 589, 591, 593, 596, 597, 600, 601–602, 605, 612–613, 617–618, 545, 547, 548–549, 555–556, 562, 567, 691; 348/383, 386.1, 393.1, 394.1, 395.1, 398.1, 400.1–400.3, 410.1, 420.1; 382/162–167, 232–236, 237–239, 245–246, 247–248, 274

(56) References Cited

U.S. PATENT DOCUMENTS

| | | | | |
|---|---|---|---|---|
| 4,631,532 A | * | 12/1986 | Grothe ....................... 340/703 |
| 4,985,853 A | | 1/1991 | Taylor et al. |
| 5,214,753 A | * | 5/1993 | Lee et al. ................... 395/125 |
| 5,398,297 A | | 3/1995 | Clark et al. |
| 5,487,172 A | * | 1/1996 | Hyatt ......................... 395/800 |
| 5,838,266 A | * | 11/1998 | Houle et al. ................... 341/51 |
| 5,904,653 A | * | 5/1999 | Hatfield et al. ............. 600/454 |
| 5,926,226 A | * | 7/1999 | Proctor et al. .............. 348/442 |
| 5,995,655 A | * | 11/1999 | Lockett et al. .............. 382/162 |
| 6,055,000 A | * | 4/2000 | Okada ......................... 345/508 |
| 6,115,485 A | * | 9/2000 | Dumoulin et al. .......... 382/128 |
| 6,249,545 B1 | * | 6/2001 | Iga ........................ 375/240.01 |
| 6,326,980 B1 | * | 12/2001 | Worley, III .................. 345/691 |

\* cited by examiner

*Primary Examiner*—Matthew C. Bella
*Assistant Examiner*—Wesner Sajous
(74) *Attorney, Agent, or Firm*—Woodcock Washburn LLP

(57) ABSTRACT

The color of a pixel is represented in a pixel storage word, wherein color coordinate data and intensity data are coded separately in two fields of the pixel storage word, the color field and the intensity field. This permits a range of colors to be represented in a relatively small number of bits. In one embodiment of the invention, each of the three color coordinates of an input color is coded separately. The coded color components are concatenated and placed in a coded color field of the pixel storage word. In another embodiment of the invention, the color coordinate data is encoded as a color index, a binary value which maps to color coordinate data according to a predefined color table. Intensity data is also encoded with a binary value. The coded intensity can represent the intensity directly, or can be an index to intensity data stored in a predetermined intensity table. The invention can also convert a pixel storage word into a pixel display word, wherein the latter is a representation of the color in a format that permits ready display. For a given pixel, the coded color component data is read from the pixel storage word and processed to yield three color coordinates. The resulting color coordinates are then modulated by intensity data corresponding to the coded intensity read from the pixel storage word. This produces a pixel display word comprising three color coordinates in a form that permits display.

19 Claims, 10 Drawing Sheets

SYSTEM METHOD, AND COMPUTER PROGRAM PRODUCT FOR COMPOSITING TRUE COLORS AND INTENSITY-MAPED COLORS INTO A FRAME BUFFER

BACKGROUND OF THE INVENTION

1. Field of the Invention

The present invention pertains to computer graphics, and more particularly to digital representations of colors for storage and for display.

2. Related Art

For automated processing purposes, the color of a pixel is typically represented as an array of three binary fields, wherein each field contains the value of one of the three color coordinates. If the color is to be represented in the red/green/blue (RGB) color space, for example, one field would contain the value of the red coordinate, a second field would contain the value of the green coordinate, and a third field would contain the value of the blue coordinate.

If the set of colors to be represented requires smooth grayscale shading, the customary solution has been to increase the number of bits used to represent colors. For every additional bit used to represent colors, the number of colors that can be represented doubles. As a result, some applications now use up to 24 bits to represent the color of a single pixel.

While using such a large number of bits permits representation of a large number of colors, it also creates systemic processing problems. Significant amounts of frame buffer memory may be consumed if each pixel of an image requires 24 bits to represent color. Moreover, input and output (I/O) of such an image becomes cumbersome. Every time such an image needs to be transferred to or from memory, sent to a display device, or transferred across a network, for example, significant bandwidth is required. Alternatively, if bandwidth is limited, then the time required for I/O may become burdensome.

Hence there is a need for a system and method whereby color and grayscale shading can be represented with a relatively small number of bits. This would allow adequate color representation while conserving memory and I/O bandwidth.

SUMMARY OF THE INVENTION

The present invention provides a system and method for representing the color of a pixel in a binary pixel storage word, wherein color coordinate data and intensity data are coded separately in two fields of the pixel storage word. These two fields are denoted herein as the color field and the intensity field. This permits a range of colors to be represented in a memory device, such as a frame buffer, in a relatively small number of bits. Encoding of intensity data may be performed in several ways. In an embodiment of the invention, intensity data may be encoded with a binary value whose numerical value is between zero and $2^k-1$, where k is the length of the intensity field. The coded intensity in this case can therefore range between zero intensity and full intensity, respectively. In an alternative embodiment of the invention, the intensity may be represented as an intensity index that maps to actual intensity data according to a predefined intensity table.

Encoding of color coordinate data may also be performed in several ways. In one embodiment of the invention, each of the three color coordinates of an input color is coded separately. The coded color components are concatenated and placed in a coded color field of the pixel storage word. In another embodiment of the invention, the color coordinate data is encoded as a color index, a binary value of which corresponds to color coordinate data according to a predefined color table.

The present invention also provides a system and method for converting a pixel storage word into a pixel display word, wherein the latter is a binary representation of the color in a format that permits ready display. The coded color component data is read from the pixel storage word and processed to yield three color coordinates. The coded intensity data is processed to yield the intensity of the color. The color coordinates are then modulated by the intensity. This produces a pixel display word comprising three color coordinates in a form that permits display.

One envisioned application of the invention is the highlighting of features on a medical x-ray image. An operator wishing to designate some point or region of the monochrome image can do so by viewing the image on a computer, defining the area to be highlighted, then choosing a color with which to highlight the area. The color of each pixel in the highlighted area can then be represented using the present invention. For each such pixel, the color coordinate data can be coded and written to the color field of the pixel storage word, and the intensity data can likewise be coded and written to the intensity field. In this application, the intensity data of a color pixel can be derived directly from the grayscale value of the corresponding monochromatic pixel of the original image.

BRIEF DESCRIPTION OF THE FIGURES

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

I. Overview

The present invention provides a system and method for efficiently representing the color of a pixel in a memory medium, such as a frame buffer. The invention also provides a system and method for converting the stored color representation into a form which allows the pixel to be displayed.

Figure 1:
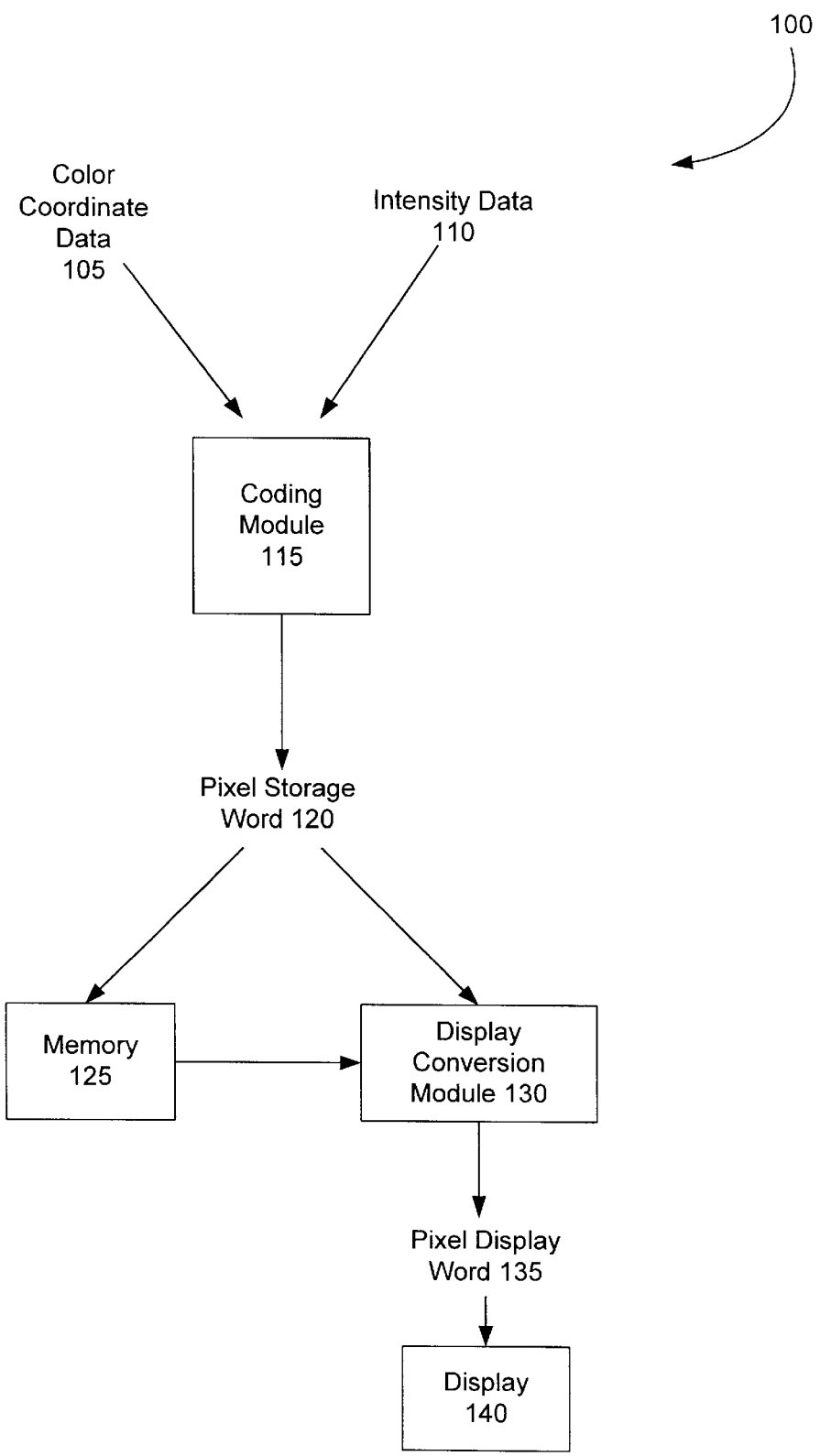
FIG. 1 is a data flow diagram illustrating the basic operation and apparatus of an embodiment of the invention.

The invention is illustrated in FIG. 1. To form a representation of a color, color coordinate data 105 is sent to a coding module 115. Information representing intensity, intensity data 110, is also sent to coding module 115. Coding module 115 encodes these inputs to form a pixel storage word 120. Pixel storage word 120 serves as a representation of the color, and can be stored in memory device 125 for subsequent processing.

Pixel storage word 120 is converted by a display conversion module 130 into a color representation for display. Pixel storage word 120 may be either read from memory device 125, or it may alternatively be taken directly from the output of coding module 115. Display conversion module 130 uses pixel storage word 120 to produce a pixel display word 135, a digital representation of the color suitable for display purposes. Pixel display word 135 can then be sent to a display device 140.

II. Representing Colors with Pixel Storage Words

The representation of a color in a pixel storage word allows storage of a color in a relatively compact form. This is accomplished by separately coding two inputs, information denoting the color coordinates and information denoting intensity. The resulting pixel storage word therefore comprises two fields, a color field and an intensity field. Using this approach results in a pixel storage word that can be shorter than the 24-bit words commonly used today to represent colors.

Formation of a pixel storage word is performed by a coding module. The coding module can be embodied in hardware, software, or some combination thereof. The coding module processes both the color coordinate data of an input color and intensity data, and outputs a coded color and a coded intensity, respectively. Algorithms for coding an input color and an intensity are well known to persons skilled in the relevant art.

In an embodiment of the invention, the color coordinate data of the input color is decomposed into three color coordinates of a conventional color space, such as the red, green, and blue coordinates of the red/green/blue (RGB) color space. The coding module then represents each color coordinate of the input color separately as a coded color component for output. In alternative embodiments of the invention, a coded color component may be created by approximating or truncating the value of the original color component. A coded color may also be created by encoding the input color coordinate data by a color index, which can later be decoded using a color index table.

In an embodiment of the invention, the intensity of the input color is coded as a binary value between zero and $2^k-1$, where k is the length of the intensity field. A coded intensity of zero represents zero grayscale intensity, while a value of $2^k-1$ represents maximum grayscale intensity. In an alternative embodiment, the intensity of the input color is coded as an index value that is mapped to the actual intensity through a predetermined intensity table.

Figure 2A:
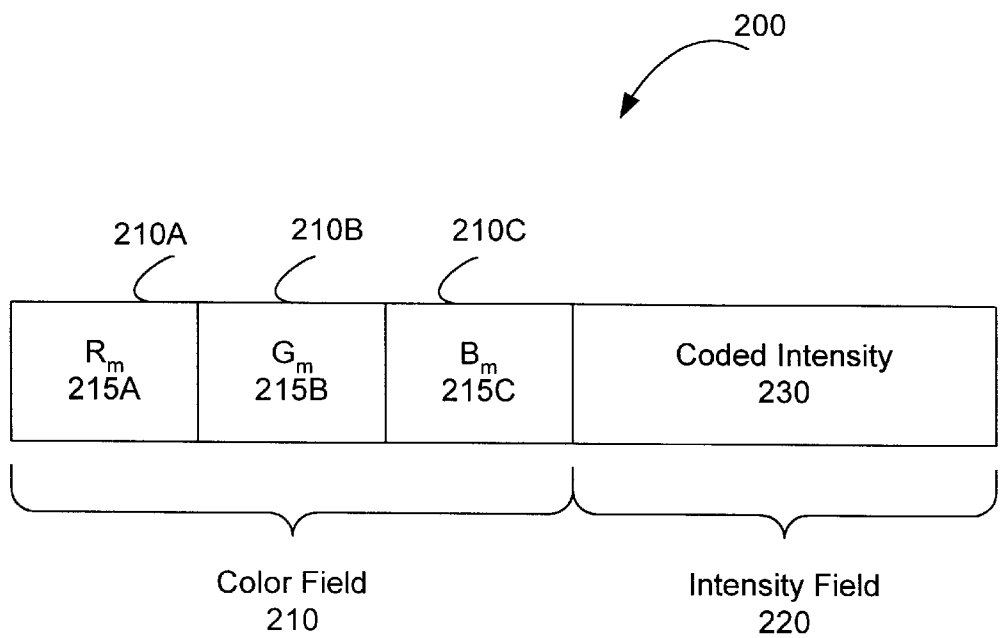
FIG. 2A illustrates the format of a pixel storage word comprising coded color components, according to an embodiment of the invention.

A pixel storage word according to an embodiment of the invention is illustrated in FIG. 2A. The color is represented in two fields, a color field 210 and an intensity field 220. In this embodiment, color field 210 is composed of three subfields, 210A through 210C. Each subfield contains data corresponding to one of three color coordinates. The data in these subfields is produced by coding module 115, which codes each of the three color components of the input color (i.e., color coordinate data 105). Data 215A is the coded color component corresponding to the red coordinate of the input color. Similarly, data 215B and 215C are the coded color components corresponding to the green and blue coordinates, respectively. Intensity field 220 contains coded intensity 230, the output of coding module 115 that represents input intensity data 110.

In an embodiment of the invention, each coded color component is two bits long and the coded intensity is six bits long. In alternative embodiments, these lengths may differ. Moreover, in some embodiments of the invention, the coded color components may not be identical in length.

In another embodiment of the invention, the color coordinate data of the input color is coded as a color index by coding module 115. This can be accomplished, for example, by approximating input color coordinate data 105 to a color identified in a color table. In this way, the color most closely matching input color coordinate data 105 is chosen from the color table. A corresponding value, the color index, is then read from the table and serves as the output of coding module 115.

Figure 2B:
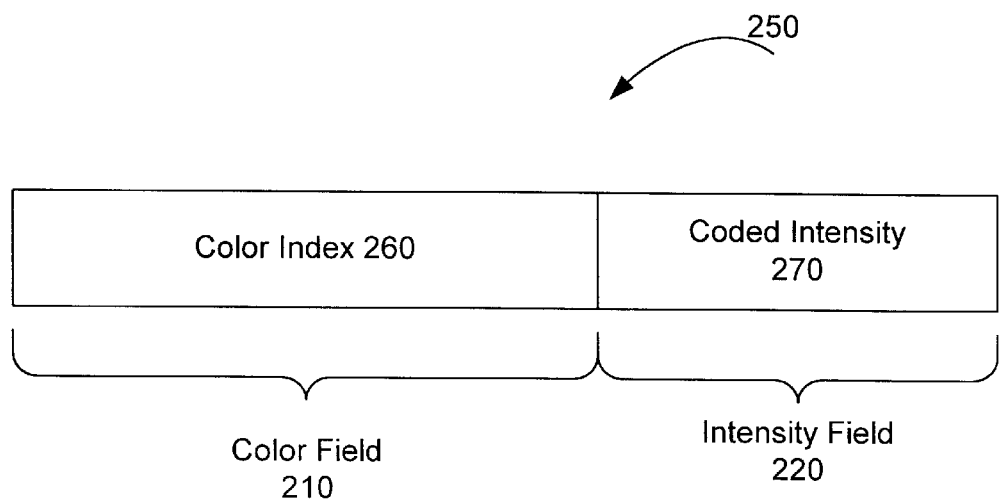
FIG. 2B illustrates the format of a pixel storage word comprising a color index, according to an embodiment of the invention.

A pixel storage word according to this embodiment of the invention is illustrated in FIG. 2B. Again, the color is represented in two fields, a color field 210 and an intensity field 220. In this embodiment, color field 210 contains a single block of data, color index 260, corresponding to color coordinate data 105 of the input color. Intensity data 110 of the input color is represented as coded intensity 270, contained in intensity field 220.

In the embodiments of FIGS. 2A and 2B, the coded intensities of the input color (230 and 270, respectively) can be binary values between zero and $2^k-1$, where k is the length of the intensity field. A coded intensity of zero represents zero grayscale intensity, while a value of $2^k-1$ represents maximum grayscale intensity. Alternatively, intensity can be coded as an intensity index value. In this case, intensity index values are related to actual intensity via a predetermined intensity table. The index value is then used as the coded intensity.

III. Conversion to Pixel Display Words

The present invention provides a system and method for the conversion of pixel storage words to a form that can be output for display. The digital representation of the pixel for display purposes is known as a pixel display word. The specific conversion process depends on the format of the pixel storage word.

A. Pixel Storage Word Comprising Coded Color Components

Figure 3:
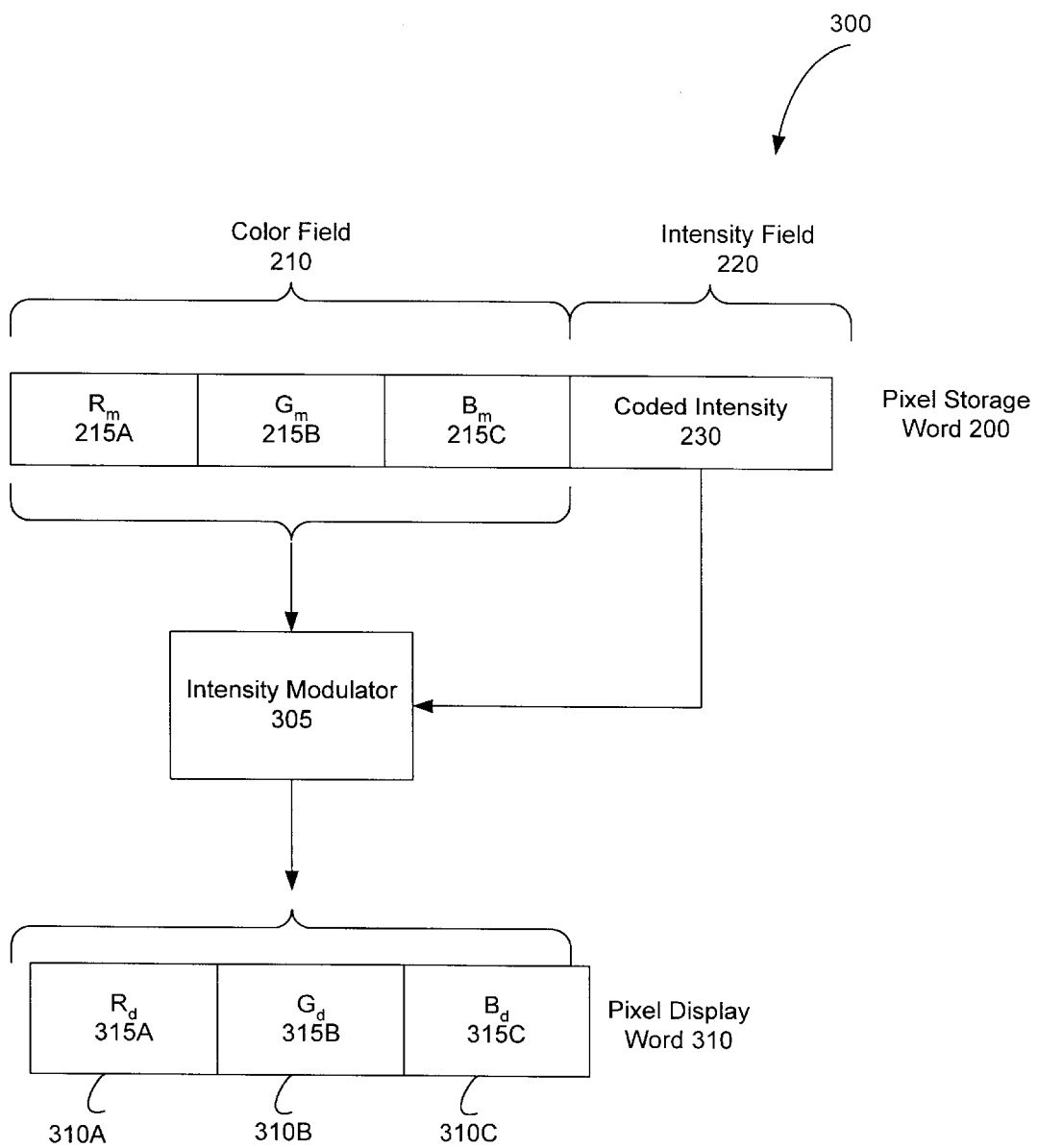
FIG. 3 is a data flow diagram illustrating conversion of a pixel storage word to a pixel display word, wherein the pixel storage word comprises coded color components, according to an embodiment of the invention.

If the pixel storage word is in a format where color coordinates are coded separately as coded color components, the conversion to a pixel display word is illustrated in FIG. 3. Pixel display word 200, comprising color field 210 and intensity field 220, is input to an intensity modulator 305. Specifically, coded color components 215A through 215C are entered into intensity modulator 305, and intensity data corresponding to coded intensity 230 is used by intensity modulator 305 to modulate the coded color components 215A through 215C. The modulation process is described below. The result is a pixel display word 310, comprising red, green, and blue modulated color components 315A through 315C respectively. The pixel display word can then be displayed.

Figure 4:
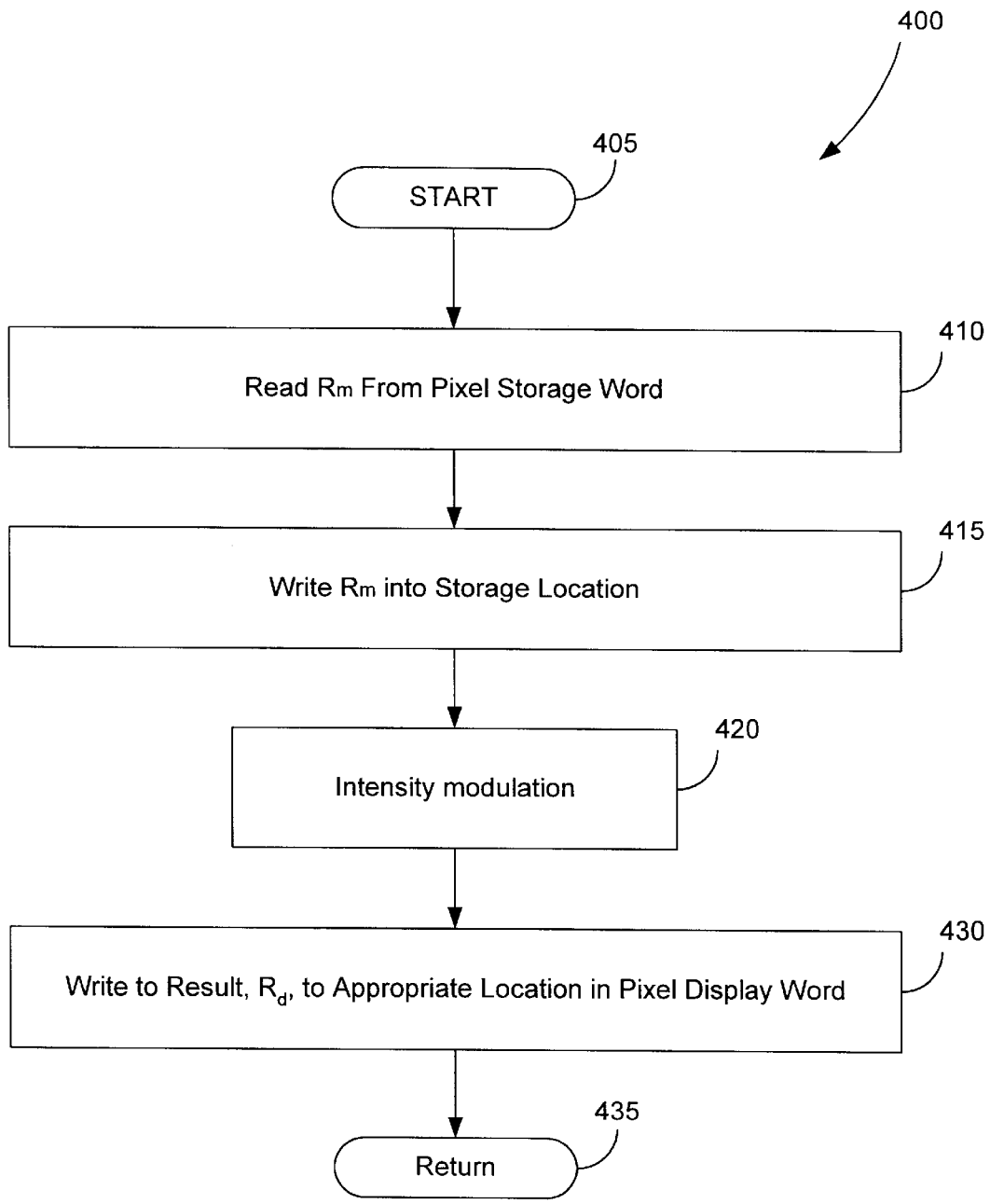
FIG. 4 is a flowchart illustrating operation of an intensity modulator, according to an embodiment of the invention.

The processing of intensity modulator 305, according to an embodiment of the invention, is illustrated in FIG. 4. The process begins with a step 405. In a step 410, the coded color component corresponding to the red coordinate is read from the pixel storage word. This coded color component is denoted $R_m$. In a step 415, $R_m$ is written to a storage location for purposes of manipulation. In a step 420, $R_m$ is modulated by the intensity data. In a step 430, the result is a color coordinate to be displayed, red color component $R_d$. This value is written to the appropriate location in a pixel display word. The operation of intensity modulator 305 concludes with a step 435.

The process is analogous for the green and blue coded color components of the pixel storage word, $G_m$ and $B_m$.

B. Pixel Storage Word Comprising a Color Index

Figure 5:
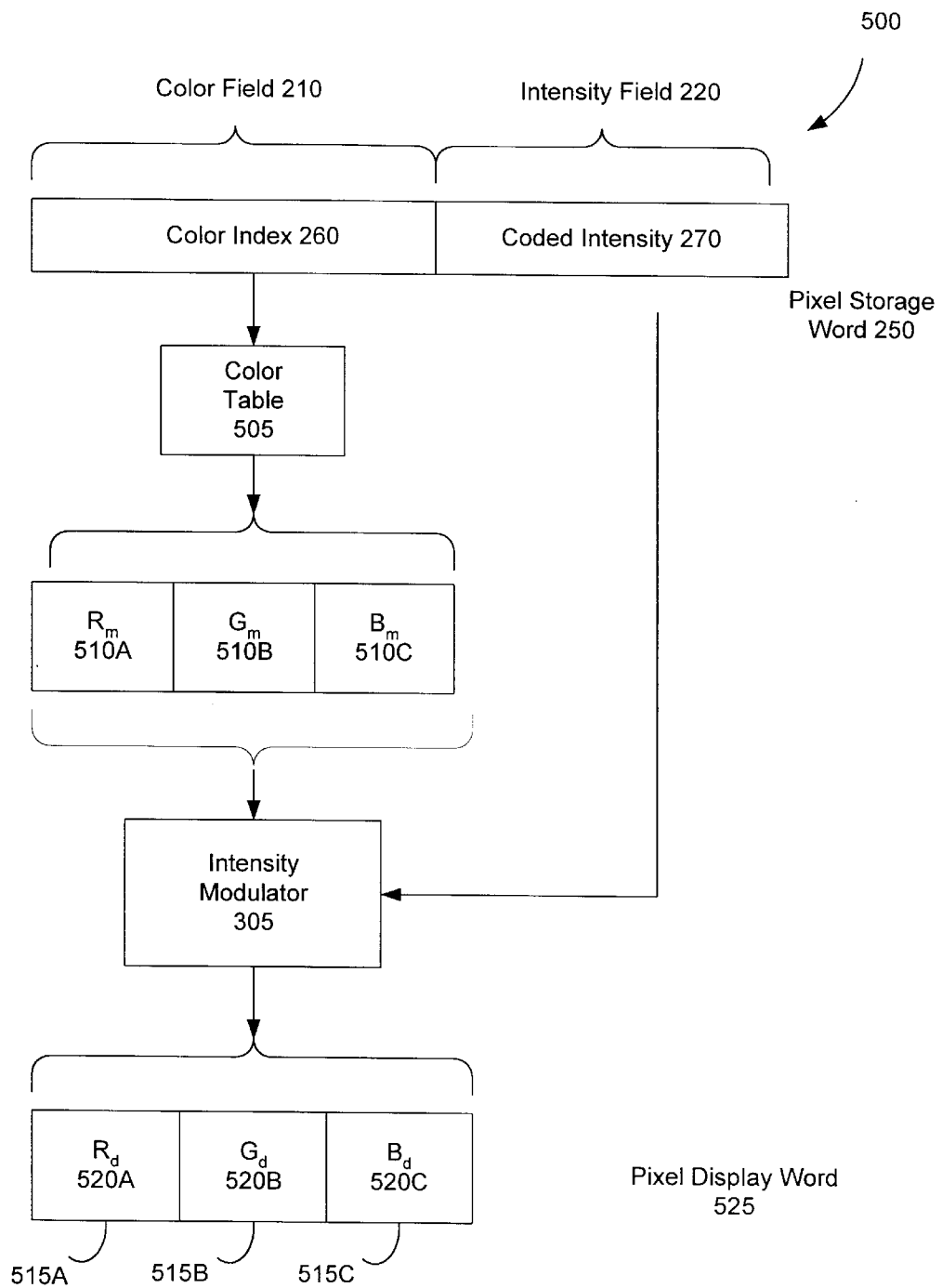
FIG. 5 is a data flow diagram illustrating conversion of a pixel storage word to a pixel display word, wherein the pixel storage word comprises a color index, according to an embodiment of the invention.

If the pixel storage word is in a format where the color field contains a color index, the conversion to a pixel display word requires a different process. This is illustrated in FIG. 5. Pixel storage word 250 contains color index 260 and coded intensity 270. The color index 260 is used in conjunction with a color table 505 to look up a digital color representation corresponding to color index 260. A color table is a data structure which maps color indices to color representations; its design and use is well known to those skilled in the relevant art. In the embodiment illustrated in FIG. 5, the color representation accessed from the color table 505 contains three coded color components, 510A through 510C, corresponding to red, green, and blue color coordinates respectively. These components are entered into intensity modulator 305, where they are modulated by the intensity data corresponding to coded intensity 270. The result is pixel display word 525, comprising modulated color components 520A through 520C.

Figure 6:
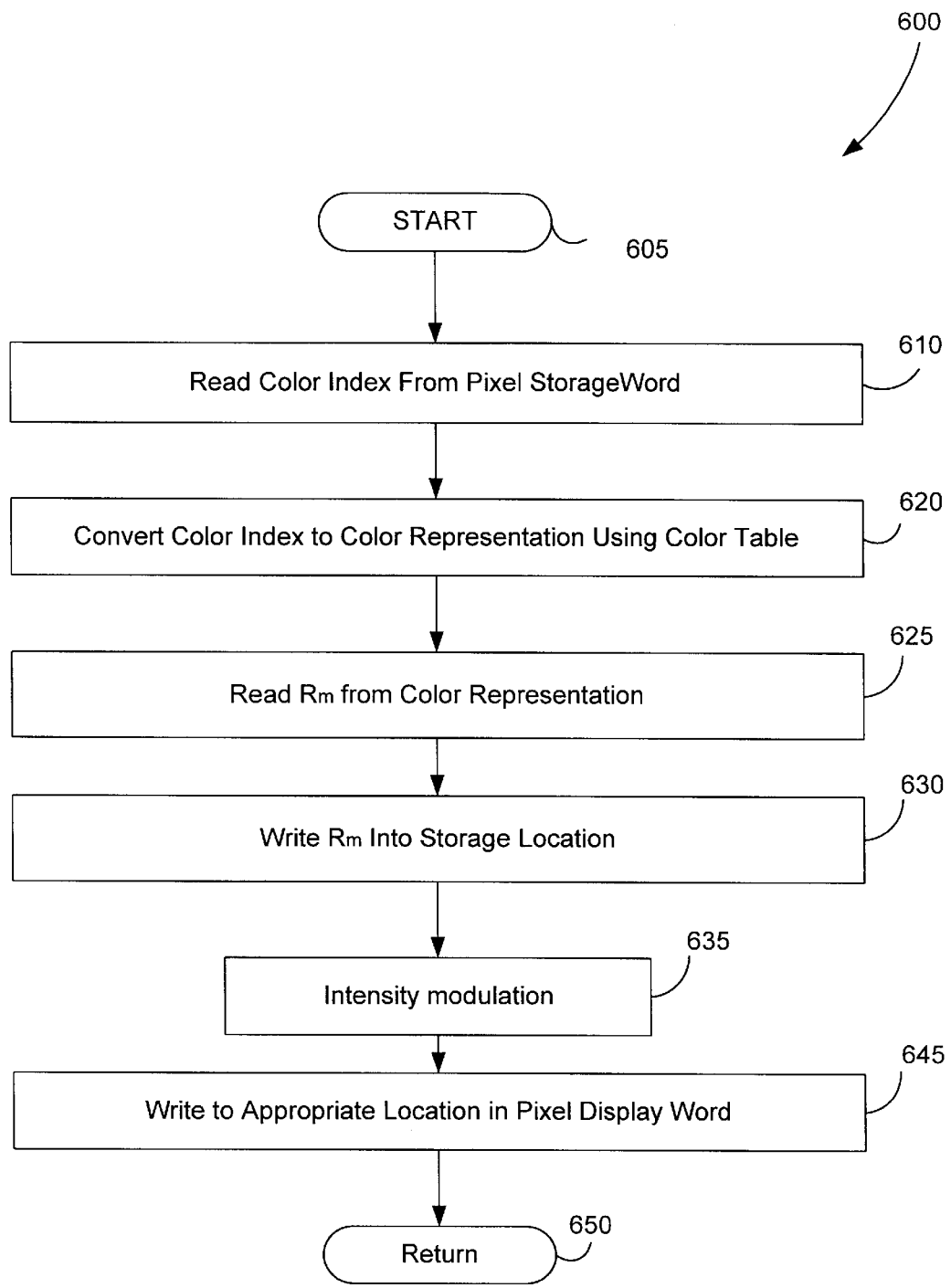
FIG. 6 is a flowchart illustrating the use of a color table and operation of an intensity modulator, according to an embodiment of the invention.

Processing of a pixel storage word having a color index is illustrated in greater detail in FIG. 6. The process begins with a step 605. In a step 610 the color index is read from the pixel storage word. In a step 620, the color index is used to look up a color representation in a color table. In the embodiment of FIG. 6, this color representation comprises red, green, and blue coded color components. In a step 625, the coded color component $R_m$ is read from the resulting color representation. In a step 630, $R_m$ is written to a storage location for purposes of manipulation. In a step 635, $R_m$ is modulated by the intensity data corresponding to the coded intensity. In a step 645, the result is written to the appropriate location in a pixel display word. The process concludes with a step 650.

Steps 625 through 645 are then repeated for the green and blue coded color components, $G_m$ and $B_m$.

C. Intensity Modulation

Intensity modulation of a color coordinate can be performed in a number of ways. The coded intensity in a pixel storage word may, in an embodiment of the invention, take the form of a value I having a magnitude between zero and $2^k-1$, where k is the length of the intensity field. Here, a coded intensity of zero represents zero grayscale intensity, while a value of $2^k-1$ represents maximum grayscale intensity. Intensity modulation in this case can occur according to FIG. 7. The process begins with a step 705. In a step 710, the color coordinate is left-justified in the storage location. If the color coordinate is n bits long, then it will occupy the n most significant bits of its storage location as a result of step 710. Numerically, this is equivalent to multiplying the color coordinate by $2^{p-n}$ where p is the length, in bits, of the storage location. In a step 715, the value in the storage location is multiplied by the value $I/(2^k-1)$. This yields a modulated color coordinate.

Figure 7:
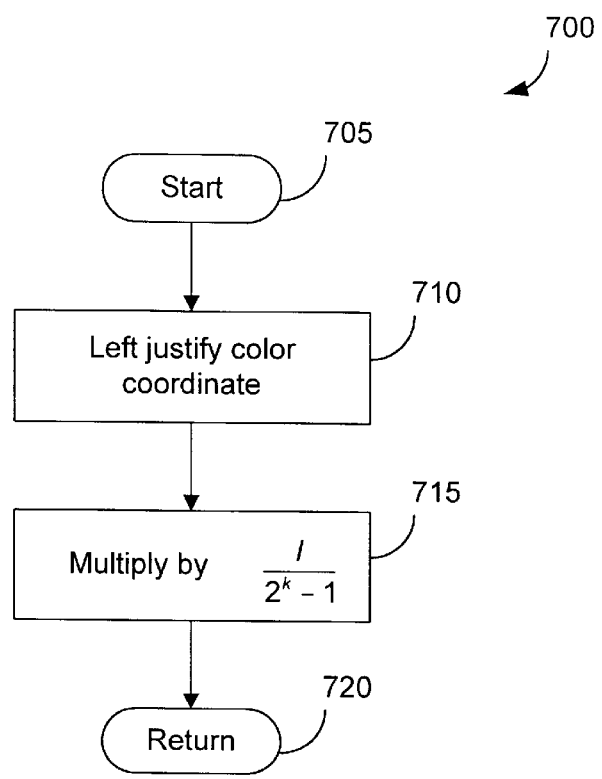
FIG. 7 is a flowchart illustrating intensity modulation of a color coordinate, according to an embodiment of the invention.

Note that in other embodiments of the invention, the intensity modulation operation may be something other than that illustrated in FIG. 7. Note also that in an embodiment of the invention (not shown), the coded intensity may be in the form of an intensity index. In this case, the coded intensity is used as an index value to access intensity data stored in an intensity table. An intensity table is a data structure which maps intensity indices to intensities; its design and use is well known to those skilled in the relevant art. The intensity data retrieved in this manner is then used to modulate each color coordinate.

D. Multiple Form Options

In an alternative embodiment of the invention, the system and method for converting a pixel storage word into a pixel display word provides for the possibility of multiple formats for pixel storage words. Some pixel storage words may have the format of FIG. 2A, for example, while others have the format of FIG. 2B. The embodiment of the invention described in this section is able to process either format. This is accomplished by including a selector field in each pixel storage word, indicating its format. When it becomes necessary to convert the pixel storage word into a pixel display word, the bits in the selector field (known hereinafter as selector bits) are interpreted, so that the conversion is performed in the proper manner. The value of the selector bits is known hereinafter as the selector value.

If the pixel storage words have one of two possible formats, such as the formats of FIGS. 2A and 2B, for example, the selector field only needs to contain one bit, since there are only two possible formats. The system for converting such pixel storage words into pixel display words therefore comprises two different means for converting pixel storage words, one for each possible format, and provides means for selecting the appropriate conversion means. In this example, the system comprises an intensity modulator similar to intensity modulator 305 of FIG. 3, and a color table similar to color table 505 of FIG. 5.

Figure 8:
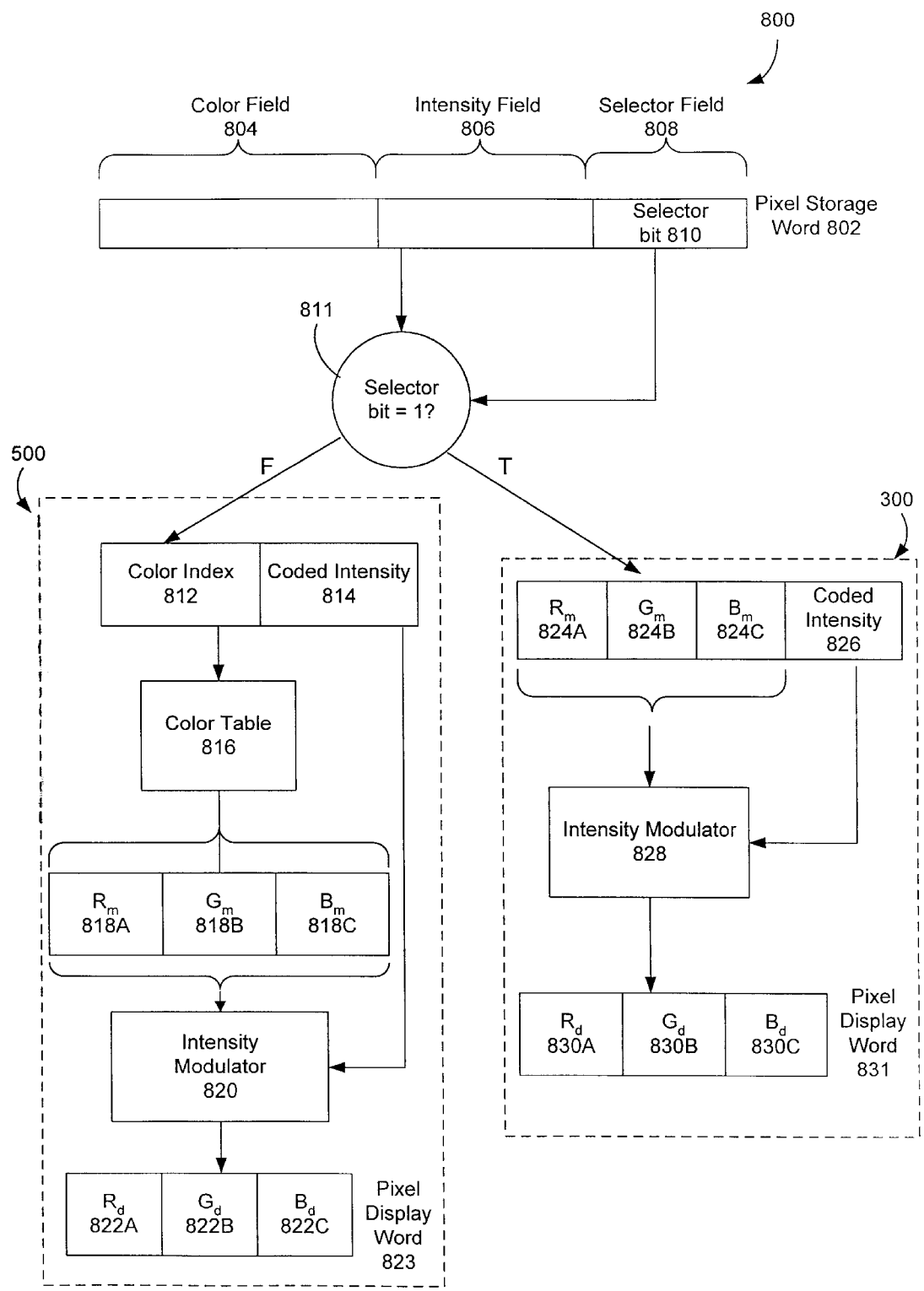
FIG. 8 is a data flow diagram illustrating an embodiment of the invention, wherein pixel storage words may be in either of two formats.

Such a system is illustrated in FIG. 8. A pixel storage word 802 comprises a color field 804, an intensity field 806, and a selector field 808. A selector bit 810 contained in selector field 808 is used by a selection process 811. In the embodiment illustrated, if the selector bit is a one, the pixel storage word 802 is interpreted as comprising three coded color components. These coded color components, 824A through 824C, correspond to red, green, and blue color coordinates. An intensity modulator 828 modulates the coded color components using intensity data corresponding to coded intensity 826, to produce a pixel display word 831. Note that components 824 through 831, in aggregate, are identical to system 300 of FIG. 3. The modulation process is that of process 400, FIG. 4.

If the selector bit 810 is a zero, then pixel storage word 802 is interpreted as comprising a color index 812. A color table 816 is used to convert the color index 812 to a set of coded color components 818A through 818C. The coded color components 818A through 818C are then converted to a pixel display word 823 by an intensity modulator 820, using intensity data corresponding to coded intensity 814. Note that components 812 through 823, in aggregate, are identical to system 500 of FIG. 5. The process of forming a pixel display word is that of process 600, FIG. 6.

Figure 9:
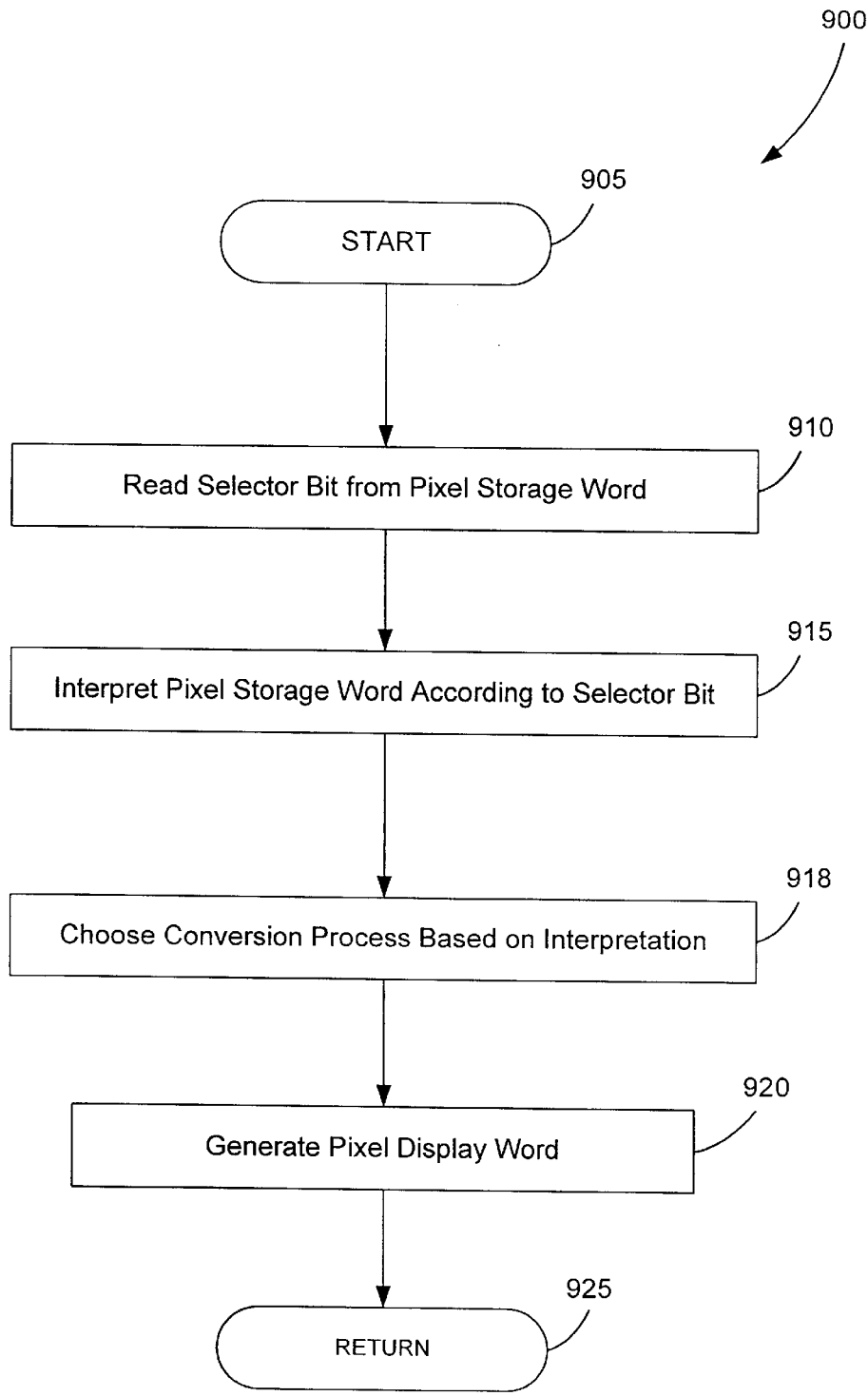
FIG. 9 is a flowchart illustrating operation of an embodiment of the invention, wherein pixel storage words may be in either of two formats.

The conversion process for this embodiment is summarized in FIG. 9. The process starts with a step 905. In a step 910, a selector bit is read from a pixel storage word. In a step 915, the format of the pixel storage word is interpreted according to the value of the selector bit. In a step 918, a conversion process is chosen, based on the interpretation of the pixel storage word. In a step 920, a pixel display word is generated using the chosen process. The conversion process concludes with a step 925.

Note that in the embodiment described here, there are two possible interpretations of a pixel storage word. In alternative embodiments (not shown), additional formats for pixel storage words are also possible. As described above, coded intensity data may be interpreted in more than one way, for example. Therefore, the number of possible formats may exceed two, and the selector field may require more than one bit in order to specify how the pixel storage word is to be interpreted.

In addition, in alternative embodiments of the invention, different pixel storage words associated with a given image may have different values in their respective selector fields. This would indicate that different pixels are to be converted to pixel display words in different manners. Also, while the selector field comprises the least significant bits of the pixel storage word in the example embodiment of FIGS. 8 and 9, the selector field may reside elsewhere in the pixel storage word in alternative embodiments of the invention (not shown).

In another alternative embodiment of the invention (not shown), the selector field associated with one or more pixel storage words is not stored with each pixel storage word. Rather, selector bits may reside elsewhere in memory. This embodiment would therefore require that the selector bits be accessed separately in order to properly convert a pixel storage word into a pixel display word.

IV. Environment

Figure 10:
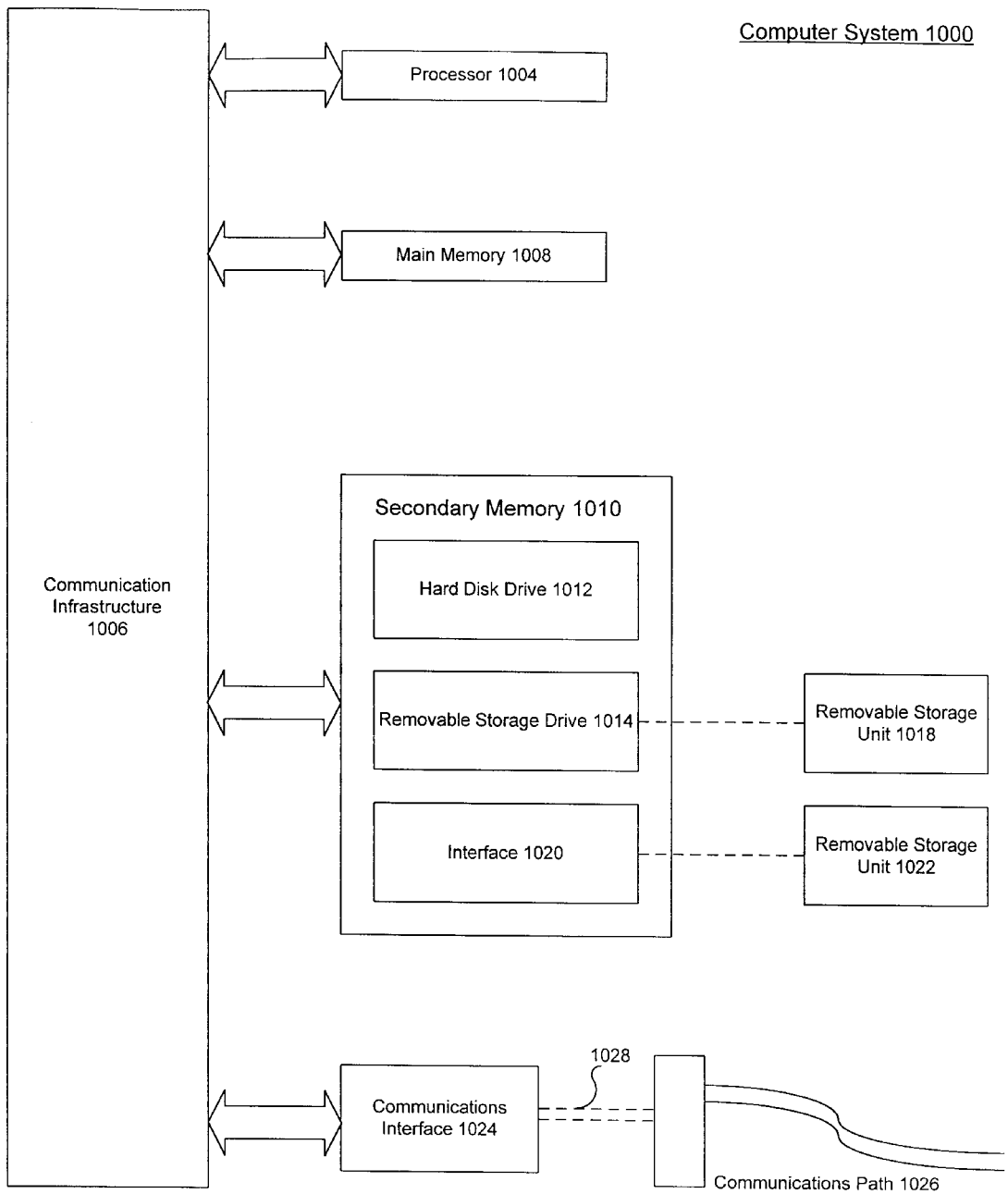
FIG. 10 illustrates a generic computer system which may be used to perform the operations of the present invention.

The present invention may be implemented using hardware, software or a combination thereof and may be implemented in a computer system or other processing system. An example of such a computer system 1000 is shown in FIG. 10. The computer system 1000 includes one or more processors, such as processor 1004. The processor 1004 is connected to a communication infrastructure 1006, such as a bus or network). Various software implementations are described in terms of this exemplary computer system. After reading this description, it will become apparent to a person skilled in the relevant art how to implement the invention using other computer systems and/or computer architectures.

Computer system 1000 also includes a main memory 1008, preferably random access memory (RAM), and may also include a secondary memory 1010. The secondary memory 1010 may include, for example, a hard disk drive 1012 and/or a removable storage drive 1014, representing a floppy disk drive, a magnetic tape drive, an optical disk drive, etc. The removable storage drive 1014 reads from and/or writes to a removable storage unit 1018 in a well known manner. Removable storage unit 1018, represents a floppy disk, magnetic tape, optical disk, or other storage medium which is read by and written to by removable storage drive 1014. As will be appreciated, the removable storage unit 1018 includes a computer usable storage medium having stored therein computer software and/or data.

In alternative implementations, secondary memory 1010 may include other means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Examples of communications interface 1024 may include a modem, a network interface (such as an Ethernet card), a communications port, a PCMCIA slot and card, etc. Software and data transferred via communications interface 1024 are in the form of signals 1028 which may be electronic, electromagnetic, optical or other signals capable of being received by communications interface 1024. These signals 1028 are provided to communications interface 1024 via a communications path (i.e., channel) 1026. This channel 1026 carries signals 1028 and may be implemented using wire or cable, fiber optics, a phone line, a cellular phone link, an RF link and other communications channels. In an embodiment of the invention, signals 1028 comprise information concerning the color to be represented, such as color coordinate data 105 and intensity data 110. Alternatively, color coordinate data 105 and intensity data 110 may be provided to computer system 1000 from secondary memory 1010. The output of coding module 115, pixel storage word 120, may also be directed to communications interface 1024, or may be alternatively directed to secondary memory 1010.

In this document, the terms "computer program medium" and "computer usable medium" are used to generally refer to media such as removable storage units 1018 and 1022, a hard disk installed in hard disk drive 1012, and signals 1028. These computer program products are means for providing software to computer system 1000.

Computer programs (also called computer control logic) are stored in main memory 1008 and/or secondary memory 1010. Computer programs may also be received via communications interface 1024. Such computer programs, when executed, enable the computer system 1000 to implement the present invention as discussed herein. In particular, the computer programs, when executed, enable the processor 1004 to implement the present invention. Accordingly, such computer programs represent controllers of the computer system 1000. Where the invention is implemented using software, the software may be stored in a computer program product and loaded into computer system 1000 using removable storage drive 1014, hard drive 1012 or communications interface 1024. In an embodiment of the present invention, the coding module 115 is implemented in software and can therefore be made available to processor 1004 through any of these means. In an embodiment of the present invention, display conversion module 130 is also implemented in software, although the preferred implementation is in hardware.

V. Conclusion

While various embodiments of the present invention have been described above, it should be understood that they have been presented by way of example, and not limitation. It will be apparent to persons skilled in the relevant art that various changes in detail can be made therein without departing from the spirit and scope of the invention. Thus the present invention should not be limited by any of the above-described exemplary embodiments, but should be defined only in accordance with the following claims and their equivalents.

What is claimed is:

1. A method of representing a pixel color for storage and display, comprising the steps of:

a) coding color coordinate data of the color to produce a coded color;

b) writing said coded color to a color field of a pixel storage word;

c) separately coding intensity data;
d) writing said coded intensity to an intensity field of said pixel storage word; and
e) intensity modulating the coded color with the coded intensity to convert said pixel storage word into a pixel display word.

2. The method of claim 1, wherein step a) comprises the step of coding each color component in binary form, producing a coded color component corresponding to each color component.

3. The method of claim 2, wherein step e) comprises the steps of:
   i) reading each coded color component from said pixel storage word;
   ii) modulating each coded color component with said coded intensity to produce a modulated color component for each coded color component; and
   iii) writing said modulated color components to said pixel display word.

4. The method of claim 3, wherein step ii) comprises the following steps performed for each coded color component:
   A) writing said coded color component to a storage location;
   B) left-justifying said coded color component within said storage location, producing a left-justified coded color component; and
   C) multiplying said left-justified coded color component by $$\frac{I}{2^k-1},$$

where I is the coded intensity and k is the number of bits of an intensity field, to produce said modulated color component.

5. The method of claim 1, wherein step a) comprises the step of coding the pixel color in the form of a color index.

6. The method of claim 5, wherein step e) comprises the steps of:
   i) reading said color index from said pixel storage word;
   ii) using said color index to access coded color components stored in a color table;
   iii) modulating each coded color component with said coded intensity to produce a modulated color component for each coded color component; and
   iv) writing said modulated color components to said pixel display word.

7. The method of claim 6, wherein step iii) comprises the following steps performed for each said coded color component:
   A) writing said coded color component to a storage location;
   B) left-justifying said coded color component within said storage location, producing a left-justified coded color component; and
   C) multiplying said left-justified coded color component by $$\frac{I}{2^k-1}$$

where I is the coded intensity and k is the number of bits in an intensity field, to produce said modulated color component.

8. The method of claim 1, further comprising the step of
   f) writing a selector value,
   wherein step f) is performed before step e).

9. The method of claim 8, further comprising the following steps, after step f) and before step e):
   g) reading said selector value; and
   h) using said selector value to determine a method by which said pixel storage word can be converted into said pixel display word.

10. A system for representing a pixel color for storage and display, said system comprising:
    a) color coding means for coding color coordinate data of the pixel color to produce a coded color;
    b) coded color writing means for writing said coded color to a color field of a pixel storage word;
    c) intensity coding means for separately coding intensity data; and
    d) coded intensity writing means for writing said coded intensity to an intensity field of said pixel storage word; and
    e) converting means for intensity modulating the coded color with the coded intensity to convert said pixel storage word into a pixel display word.

11. The system of claim 10, wherein said color coding means comprises coded color component coding means for coding each color component in binary form, producing a coded color component corresponding to each color component.

12. The system of claim 11, wherein said converting means comprises:
    i) coded color component reading means for reading each coded color component from the pixel storage word;
    ii) coded color component modulating means for modulating each coded color component with said coded intensity to produce a modulated color component for each coded color component; and
    iii) modulated color component writing means for writing said modulated color components to said pixel display word.

13. The system of claim 12, wherein coded color component modulating means comprises:
    A) storage location writing means for writing each coded color component to a storage location;
    B) left-justifying means for left-justifying each coded color component within said storage location, producing a left-justified coded color component; and
    C) multiplying means for multiplying said left-justified coded color component by $$\frac{I}{2^k-1},$$

where I is said coded intensity and k is the number of bits of an intensity field, to produce said modulated color component.

14. The system of claim 10, wherein said color coding means comprises index coding means for coding the pixel color in the form of a color index.

15. The system of claim 14, wherein said converting means comprises:
    i) color index reading means for reading said color index from said pixel storage word;
    ii) color table access means for using said color index to access coded color components stored in a color table;

iii) coded color component modulating means for modulating each coded color component with said coded intensity to produce a modulated color component for each coded color component; and iv) modulated color component writing means for writing said modulated color components to said pixel display word.

16. The system of claim 15, wherein said coded color component modulating means comprises:

A) storage location writing means for writing said coded color component to a storage location;

B) left-justifying means for left-justifying said coded color component within said storage location, producing a left-justified coded color component; and C) multiplying means for multiplying said left-justified coded color component by $$\frac{I}{2^k - 1}$$

where I is said coded intensity and k is the number of bits in an intensity field, to produce said modulated color component.

17. The system of claim 10, further comprising:

f) selector value writing means for writing a selector value.

18. The system of claim 17, further comprising:

g) selector value reading means for reading said selector value; and h) conversion method determining means for using said selector value to determine a method by which said pixel storage word can be converted into said pixel display word.

19. A computer program product comprising a computer usable medium having computer readable program code means embodied in said medium for causing an application program to execute on a computer that represents a pixel color in digital form, said computer readable program code means comprising:

a) first computer readable program code means for causing the computer to code color coordinate data of the pixel color to produce a coded color;

b) second computer readable program code means for causing the computer to write said coded color to a color field of a pixel storage word;

c) third computer readable program code means for causing the computer to separately code intensity data;

d) fourth computer readable program code means for causing the computer to write said coded intensity to an intensity field of said pixel storage word; and e) fifth computer readable program code means for causing the computer to intensity modulate the coded color with the coded intensity to convert said pixel storage word into a pixel display word.

* * * * *